June 6, 1933.  R. L. MANICKE  1,913,337
BAKING PAN
Filed Sept. 4, 1931
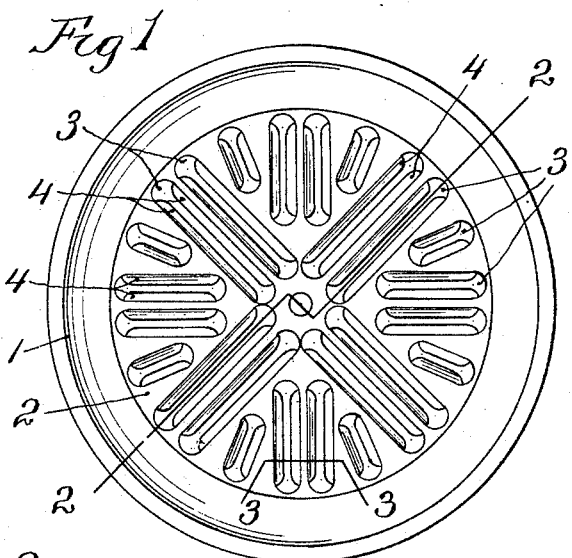
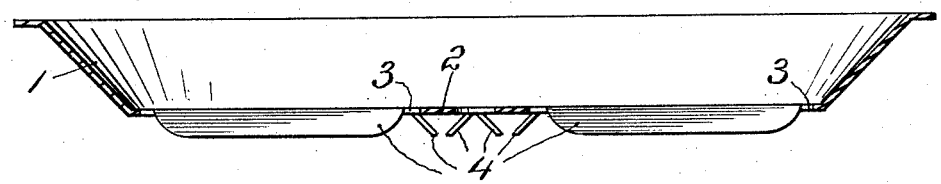
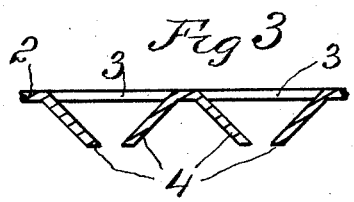
INVENTOR
Ruby L. Manicke
BY Warren D. House,
Her ATTORNEY
Witness
H. Vernon Olson Patented June 6, 1933

1,913,337

UNITED STATES PATENT OFFICE

RUBY L. MANICKE, OF KANSAS CITY, MISSOURI, ASSIGNOR OF FIFTY ONE-HUNDREDTHS TO HARRY F. JOHNS, JR., AND FIVE ONE-HUNDREDTHS TO LOUIS N. SMYTH, BOTH OF KANSAS CITY, MISSOURI

BAKING PAN

Application filed September 4, 1931. Serial No. 561,162.

My invention relates to improvements in baking pans, particularly adapted for baking pies and the like having bottom crusts.

One object of my invention is to provide a novel baking pan having a bottom provided with openings which permit of circulation of air in contact with the bottom crust to prevent the crust from becoming soggy, the bottom at opposite sides of each of said openings having downwardly converging flanges which support the bottom crust in the openings and permit of the easy withdrawal of the crust without breaking from the openings after the crust has been properly baked, said converging flanges also serving as a support for the pan with the bottom raised to permit the circulation of air thereunder.

A further object of my invention provides an arrangement of the crust supporting flanges by which they will support the pan on a grill without liability of the pan tipping.

My invention provides further converging supporting flanges each of which has its ends diverging from the lower edge of the flange, whereby a flat blade of a pan lifter may slide under the flanges, for removing the pan from the oven, without liability of the blade catching on the ends of the flanges. By providing the converging flanges, the flat blade of a pan lifter is inserted under the flanges transversely to their length without liability of the blade catching on the sides of the flanges, as it might were the flanges perpendicular or diverging from each other.

The novel features of my invention are hereinafter fully described and claimed.

In the drawing which illustrates the preferred embodiment of my invention,

Fig. 1 is a plan view of my improved baking pan.

Fig. 2 is an enlarged sectional view on the line 2—2 of Fig. 1.

Fig. 3 is a further enlarged section on the line 3—3 of Fig. 1.

Similar reference characters designate similar parts in the different views.

1 designates the body of the pan corresponding to the body of an ordinary pie pan of circular form.

The bottom 2 of the pan is provided with openings or slots 3 therethrough, which, as shown, are, preferably, disposed radially.

The bottom 2 at opposite sides of each opening 3 is provided with two downwardly inclined flanges 4 which converge toward each other, and which serve to support the pan with the bottom 2 raised so as to permit air to circulate thereunder in contact with the bottom crust of the pie, said converging flanges 4 also serving to support the crust, not shown, in the openings 3, and which by such convergence enable the crust to be removed without breaking after the pie has been properly baked.

By disposing the flanges 4 radially, they will support the pan in a level position on a grill without liability of the pan tipping.

The ends of each flange are, preferably, diverging, as shown, from the lower edge of the flange upwardly. This enables the flat blade of a pan lifter, not shown, to be inserted under the flanges for removing the pan from the oven, without liability of the blade catching on the ends of the flanges. The convergence of the flanges 4 also permits the blade of the pan lifter to be inserted under the flanges transversely to their length without liability of the blade catching on the flanges.

In the baking of a pie in my improved pan, the bottom layer of dough which is to form the bottom crust, is disposed, as usual, on the bottom 2, and in the openings 3, the dough is supported on the inclined upper sides of the flanges 4 in contact with the air which circulates under the bottom 2, so that the bottom crust is baked hard, like the upper crust, and is not soggy.

The draft of the flanges, like the draft or downward convergence of the sides of any mold, permits the baked bottom crust to be easily removed from the openings 3 without breaking.

As shown, the face lower edges of the flanges 4 are spaced apart a substantial distance, and the slots or openings 3 extend the full lengths respectively of the flanges 4, whereby the baked dough is not liable to stick in the slots or openings 3, and if it does it may be readily extracted by passing a knife blade upwardly through the slots.

Modifications of my invention, within the scope of the appended claim, may be made without departing from its spirit.

What I claim is:—

A baking pan having a bottom provided therethrough with slots, and having at opposite side edges only of each slot two downwardly converging flanges, the lower free edges of which are spaced apart a substantial distance, each slot extending at the upper and lower edges of the adjacent flanges the full length of said upper and lower edges.

In testimony whereof I have signed my name to this specification.

RUBY L. MANICKE.